J. P. COLEMAN.
CLUTCH DEVICE.
APPLICATION FILED APR. 5, 1911.
1,003,339.
Patented Sept. 12, 1911.
2 SHEETS—SHEET 1.
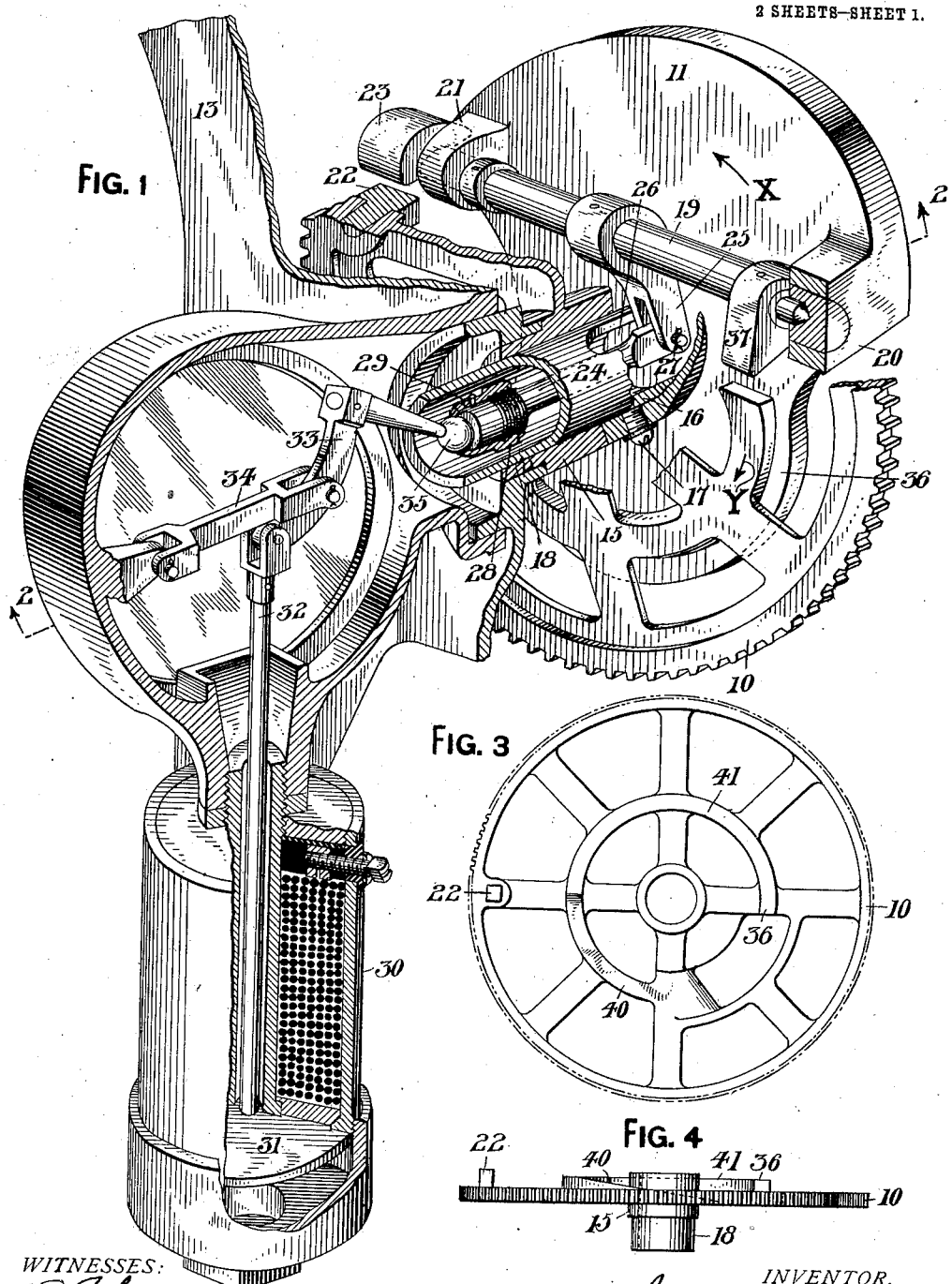

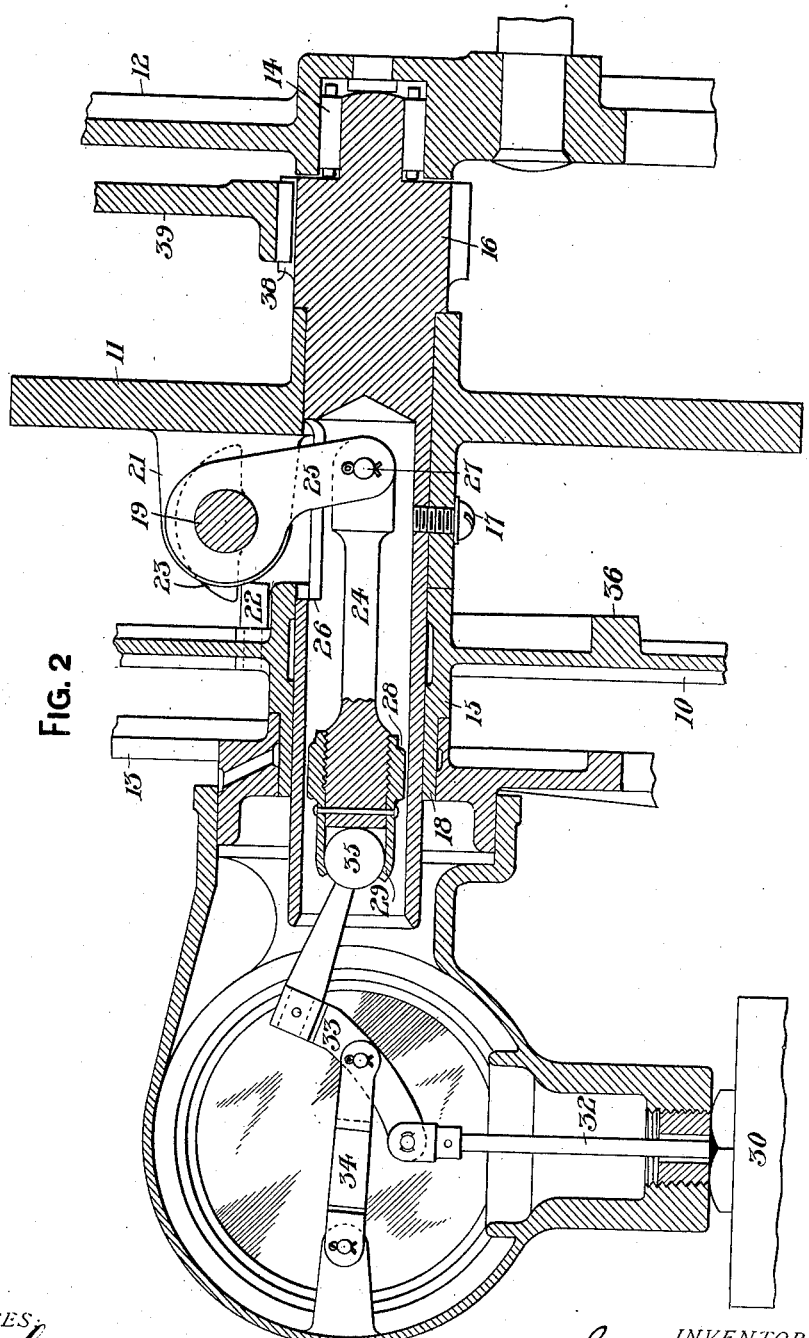

UNITED STATES PATENT OFFICE.

JOHN P. COLEMAN, OF EDGEWOOD, PENNSYLVANIA, ASSIGNOR TO THE UNION SWITCH & SIGNAL COMPANY, OF SWISSVALE, PENNSYLVANIA, A CORPORATION OF PENNSYLVANIA.

CLUTCH DEVICE.

1,003,339.

Specification of Letters Patent. Patented Sept. 12, 1911.

Application filed April 5, 1911. Serial No. 618,995.

*To all whom it may concern:*

Be it known that I, JOHN P. COLEMAN, a citizen of the United States, residing at Edgewood, in the county of Allegheny and State of Pennsylvania, have invented certain new and useful Improvements in Clutch Devices, of which the following is a specification.

I will describe a clutch device embodying my invention, and then point out the novel features thereof in claims.

In the accompanying drawings, Figure 1 is a perspective view, partly sectioned, showing one form of a clutch device embodying my invention. Fig. 2 is a sectional view on the line 2—2 of Fig. 1 looking in the direction of the arrow. Fig. 3 is a view showing more clearly one of the members of the clutch device shown in the preceding views, and Fig. 4 is a side view of the member shown in Fig. 3.

Similar reference characters refer to similar parts in each of the views.

Referring to Figs. 1 and 2 of the drawings, 10 and 11 are two clutch members mounted as here shown to have concentric and independent rotation. As here shown, the member 11 is secured to a shaft 16 by means of a set screw 17. One end of the shaft 16 is journaled in roller bearings 14 which are carried by a portion 12 of a suitable stationary framework. The other end of the shaft 16 is journaled in a bearing formed by a hub 15 of the clutch member 10. This hub 15 has an extended portion 18 on one side of the member 10, which extended portion serves as a journal to rotate in a bearing formed by a portion 13 of the stationary framework. A portion of the shaft 16 is hollow for purposes hereinafter explained.

For purposes of this specification, I will assume that the member 10 is the operating or driving member; that is, this member is operatively connected with a suitable motor device by which it is rotated in the direction indicated by the arrow Y, and that the member 11 is operatively connected with a "load" which is to be driven, and which is to be held in the position or positions to which it is driven. The "load" tends to rotate this member 11 in the direction indicated by the arrow X.

19 designates a rocking shaft suitably mounted on the clutch member 11. As here shown, this shaft is journaled adjacent each end in bearings formed by two lugs 20 and 21 carried by the member 11. Rigidly secured to the shaft 19 is a dog 23 which is so arranged as to be rotated by the rocking of the shaft 19 into and out of position for engagement with a stud 22 which is rigidly secured to the rotatable member 10. It will be evident that when the shaft 19 is held against rotation upon its axis and the dog is in position for engagement with the stud 22, a rotary movement of either of the members 10 or 11 in the proper direction will be transmitted to the other member.

25 designates a crank rigidly secured to the shaft 19 and projecting through a slot 26 into the hollow portion of the shaft 16. This crank is bifurcated to form a jaw, which jaw is provided with a pin 27 located substantially in the axis of rotation of the clutch members 10 and 11.

24 is a member pinned in the jaw of the crank 25 and adapted for longitudinal movements through the hollow portion of the shaft 16 in substantially the line of the axis of rotation of the clutch members 10 and 11. The movements of the members 24 are constrained to this axial line by means of a suitable guide formed by an enlarged portion 28 which bears against the inside surface of the hollow portion of the shaft 16.

It will be evident from the foregoing description that if pressure is exerted on the longitudinally movable member 24 in a direction toward the crank 25, the dog 23 will be held in position for engagement with the stud 22; and that the two rotatable members 10 and 11 will be in operative relation. Also, when this pressure is released the effort of one member to drive the other will result in a pressure between the dog and the stud, which will rotate the dog out of the path of the stud, and the members will be disconnected or thrown out of operative relation. This pressure on the longitudinally movable members 24 may be exerted by any suitable means. As here shown, an armature 31 of a stationary electro-magnet 30 is connected through a rod 32 and links 33 and 34 with a ball, 35, which bears against the end of the member 24. This ball 35 is loosely mounted in a suitable socket 29 affixed to the end of the member 24. The links 33 and 34 are so arranged that an upward movement of the armature 31 and the rod 32 will cause a movement of the ball 35 in such a direction as to move the dog 23 into position for engagement with the stud 22; and the dog will be held in such position as long as the armature is held up by its controlling electro-magnet 30.

Although the means which I have herein shown for exerting pressure on the longitudinally movable member 24 is an electro-magnet, I do not wish to be limited to this particular means, nor do I wish to be limited to the specific form of electro-magnet shown and described herein.

In order to provide the required length of stroke of the member 24, the stroke of the armature 31 is necessarily great, and if the electro-magnet 30 were depended upon for raising the armature, the power required would be many times greater than that required to hold the parts in the engaging position after they have been placed there. Hence it is desirable to provide means for raising the armature 31 against the magnet pole-pieces when the dog and the stud approach each other. As here shown, this means comprises a cam surface 36 on the clutch member 10, which cam surface acts upon a restoring pawl 37 carried by the shaft 19 to rotate the shaft into such position that the dog 23 lies in the path of the stud 22, and to thereby raise the armature 31 upward against the pole-pieces of the electro-magnet 30. This action of the cam surface upon the restoring pawl occurs whenever either of the members 10 or 11 rotates relatively to the other in the direction of arrow X or Y. As shown more clearly in Figs. 3 and 4, the cam surface 36 is preferably formed with an inclined face 40 which acts gradually upon the restoring pawl 37, the remainder of the cam surface being a flat face 41. This means just described for raising and holding the armature 31 against the pole-pieces of the electro-magnet 30 must cease to exert any holding effort before the dog 23 is brought into contact with the stud 22, otherwise it would prevent the rotation of the shaft by the pressure of the stud 22 on the dog 23 for disengagement of the two clutch members when the electro-magnet is deënergized. The cam 36 is therefore so formed as to end abruptly and to pass out of position for engagement with the restoring pawl 37 just before the stud 22 and the dog 23 come into contact with each other. But when the two clutch members are to be operatively engaged, it is essential that the electro-magnet 30 should be energized before the cam surface 41 and the restoring pawl 37 pass out of mutual engagement, so that when these last mentioned members do pass out of engagement the electro-magnet will be exerting its effort to hold the armature 31 and the dog 23 in the position to which they have been moved by the cam 36.

A clutch device embodying my invention may be employed in connection with numerous forms of apparatus, but it is especially adapted to railway signal mechanisms, and may be used in a signal mechanism substantially like that shown and described in my co-pending application Serial No. 558,984.

Although I have herein shown and described only one form of clutch device embodying my invention, I do not wish to be limited to this specific form, for it is understood that this form may be widely departed from without departing from the spirit and scope of my invention.

Having thus described my invention, what I claim is:

1. In a clutch device, two independent rotatable members, a stud carried by one of said members, a dog carried by the other member and having movement relatively thereto, the said relative movement being into and out of position for engagement with the stud, a stationary electro-magnet, and mechanism interposed between the electro-magnet and the dog for holding the dog in position for engagement with the stud whereby the two rotatable members may be operatively connected.

2. In a clutch device, two independent rotatable members, a stud carried by one of said members, a dog carried by the other member and having movement relatively thereto, the said relative movement being into and out of position for engagement with the stud, a stationary electro-magnet, mechanism interposed between the electro-magnet and the dog for holding the dog in position for engagement with the stud and for permitting the dog to move out of such position according to whether or not the electro-magnet is energized, and means for restoring the dog into position for engagement with the stud during a rotation of either of the rotatable members relatively to the other.

3. In a clutch device, two independent rotatable members, a stud carried by one of said members, a dog carried by the other member and having movement relatively thereto, the said relative movement being into and out of position for engagement with the stud, and means independent of the rotatable members for holding the dog in position for engagement with the stud whereby the two rotatable members may be operatively connected.

4. In a clutch device, two independent rotatable members, a stud carried by one of said members, a shaft carried by the other member and mounted to rock on an axis transverse to the axis of rotation of the said members, a dog secured to said shaft and adapted to rock into and out of position for engagement with the stud, and means including a stationary electro-magnet for holding the dog in position for engagement with the stud whereby the two rotatable members may be operatively connected.

5. In a clutch device, two independent rotatable members, a stud carried by one of said members, a shaft carried by the other member and mounted to rock on an axis transverse to the axis of rotation of the said members, a dog secured to said shaft and adapted to rock into and out of position for engagement with the stud, a stationary electro-magnet; mechanism interposed between the electro-magnet and the shaft for holding the shaft in position for the engagement of the dog with the stud, and for permitting the shaft to rock out of such position according to whether or not the electro-magnet is energized; and means for restoring the dog into position for engagement with the stud during a rotation of either of the rotatable members relatively to the other.

6. In a clutch device, two independent rotatable members, a stud carried by one of said members, a shaft carried by the other member and mounted to rock on an axis transverse to the axis of rotation of the said members, a dog secured to said shaft and adapted to rock into and out of position for engagement with the stud, and means for holding the shaft in position for engagement of the dog with the stud whereby the two rotatable members may be operatively connected.

7. In a clutch device, two independent rotatable members, a stud carried by one of said members, a shaft carried by the other member, and mounted to rock on an axis transverse to the axis of rotation of the said members, a dog secured to the shaft and arranged to rock into and out of position for engagement with the said stud; a member operatively connected with the said shaft and adapted for longitudinal movements in substantially the line of the axis of the rotatable members, and means for exerting pressure on said longitudinally movable member whereby the dog is held in position for engagement with the stud.

8. In a clutch device, two independent rotatable members, a stud carried by one of said members, a shaft carried by the other member, and mounted to rock on an axis transverse to the axis of rotation of the said members, a dog secured to the shaft and arranged to rock into and out of position for engagement with the said stud; a crank secured to the shaft, a member operatively connected with the crank and adapted for longitudinal movements in substantially the line of the axis of the rotatable members, and means for exerting pressure on said longitudinally movable member whereby the dog is held in position for engagement with the stud.

9. In a clutch device, two independent rotatable members, a stud carried by one of said members, a shaft carried by the other member, and mounted to rock on an axis transverse to the axis of rotation of the said members, a dog secured to the shaft and arranged to rock into and out of position for engagement with the said stud; a crank secured to the shaft, a member operatively connected with the crank and adapted for longitudinal movements in substantially the line of the axis of the rotatable members, a stationary electro-magnet, and mechanism interposed between the electro-magnet and the longitudinally movable member and controlled by the electro-magnet for exerting pressure on said longitudinally movable member whereby the dog is held in position for engagement with the stud.

10. In a clutch device, two independent rotatable members, a stud carried by one of said members, a shaft carried by the other member and mounted to rock on an axis transverse to the axis of rotation of the said members, a dog secured to the said shaft and adapted to rock into and out of position for engagement with the stud, a stationary electro-magnet, mechanism interposed between the electro-magnet and the shaft for holding the dog in position for engagement with the stud and for permitting the dog to move out of such engaging position; and means for restoring the dog into position for engagement with the stud during a rotation of one of the rotatable members relatively to the other, the said means comprising a cam surface carried by the rotatable member which carries the stud, and a restoring pawl carried by the rocking shaft and coacting with the cam surface.

In testimony whereof I affix my signature in presence of two witnesses.

JOHN P. COLEMAN.

Witnesses:
A. L. VENCILL,
I. J. HARTER.

---

Copies of this patent may be obtained for five cents each, by addressing the "Commissioner of Patents, Washington, D. C."